United States Patent [19]

Hoshino et al.

[11] Patent Number: 4,718,808
[45] Date of Patent: Jan. 12, 1988

[54] DELIVERY DEVICE OF PILED CORRUGATED FIBERBOARD BOXES

[75] Inventors: Noriyuki Hoshino; Tsugio Tanimura, both of Mihara, Japan

[73] Assignee: Mitsubishi Jukogyo Kabushiki Kaisha, Tokyo, Japan

[21] Appl. No.: 921,417

[22] Filed: Oct. 22, 1986

[51] Int. Cl.$^4$ .............................................. B65G 59/06
[52] U.S. Cl. .................................... 414/37; 221/274; 271/3.1; 271/138; 414/131; 414/900
[58] Field of Search .................. 414/37, 131, 900; 271/136, 137, 138, 139, 3.1; 221/274, 285

[56] References Cited

U.S. PATENT DOCUMENTS

| | | | |
|---|---|---|---|
| 1,806,391 | 5/1931 | Fitchett | 271/136 |
| 2,289,010 | 7/1942 | Greenwood | 271/136 |
| 2,756,113 | 7/1956 | Greenwood | 271/139 X |
| 3,006,276 | 10/1961 | Deslauriers et al. | 271/139 X |
| 3,420,387 | 1/1969 | Baum | 414/37 X |

FOREIGN PATENT DOCUMENTS 503739  4/1939  United Kingdom ................ 414/131

Primary Examiner—Leslie J. Paperner
Attorney, Agent, or Firm—Wenderoth, Lind & Ponack

[57] ABSTRACT

A delivery device of piled corrugated fiberboard boxes is provided, which comprises a hopper for holding therein corrugated fiberboard boxes in a piled mode, a front sheet receiver and a rear sheet receiver held at a position higher than is the front sheet receiver and having an inclined guide surface whose height is adjustable, both the receivers being disposed in a lower portion inside the hopper, a kicker movable back and forth on and along the inclined guide surface for kicking out obliquely the upper and lower sheet end faces of a lowermost corrugated fiberboard box, and upper and lower feed rolls disposed on the send-out side of the front sheet receiver, whereby deformation of the lowermost corrugated fiberboard can be amended and prevented.

2 Claims, 9 Drawing Figures

DELIVERY DEVICE OF PILED CORRUGATED FIBERBOARD BOXES

BACKGROUND OF THE INVENTION

1. Field of the Invention

This invention relates to a delivery device of piled corrugated fiberboard boxes which holds corrugated fiberboard boxes in a hopper in a piled mode and sends out successively the lowermost one among the piled corrugated fiberboard boxes one by one.

2. Description of the Prior Art

One conventional delivery device of piled corrugated fiberboard boxes is configured as shown in FIG. 6 and operates in such a manner that corrugated fiberboard boxes 1 are continuously supplied to, piled and held in a hopper 3 by upper and lower belts 9 and 10 and the lowermost one 1a among the thus piled corrugated fiberboard boxes 1 held in the hopper 3 is successively sent out one by one by a send-out conveyor belt 8. Front and rear wall portions of the hopper 3 are formed by a squaring plate 4 disposed on the supply side of the lower belt 10 and rocked via an arm by an eccentric cam 5, a rear sheet stop 11 disposed below the squaring plate, a front portion 7 of a backstop assembly 6, etc.; the backstop assembly 6 is designed so that its longitudinal position is adjustable so as to harmonize with the size of the corrugated fiberboard box 1 by means of a shifting unit (not shown) including screw shafts and the like; and the front portion 7 is attached to the backstop assembly 6 so that a gap left at the lower end thereof is adjustable.

The corrugated fiberboard box 1 is formed by being subjected in successive steps to the processes of recessing, ruled-line drawing, gluing, and folding. Thus, after folding, box 1 (as shown in FIG. 7) has a laminated glued portion 2 formed through folding and gluing, thereby leaving upper and lower sheets 12 and 13 on either side of the box. However, there is a possibility that some discrepancy appears at the laminated glued portion 2 as shown in FIG. 8, or a deformed corrugated fiberboard box results having edges 12a and 13a warped at marginal portions as shown in FIG. 9. Under ordinary circumstances, deformation of such corrugated fiberboard boxes as above is alleviated in the inside of the hopper 3 while receiving the action of the squaring plate 4 and the weight of the piled corrugated fiberboard boxes, the lowermost corrugated fiberboard box 1a is sent out through the gap below the front patch 7 one by one by means of a friction force existing between it and the send-out conveyor belt 8, the send-in rate of the upper and lower belts 9 and 10 is made to balance with the send-out rate or amount achieved by the send-out conveyor belt 8, and hence, the number of corrugated fiberboard boxes held in the hopper 3 is regulated to a given amount.

The lowermost corrugated fiberboard box 1a is sent out owing to the difference between one friction force existing between it and the send-out conveyor belt 8 and caused by a pushing pressure produced by the weight of the piled corrugated fiberboard boxes and another friction force existing between it and the lowermost-but-one corrugated fiberboard box. However, if the second-mentioned friction force existing between the first and the second lowermost boxes increases, the first-mentioned friction force due to the weight of the boxes increases and some discrepancy tends to appear at the laminated glued portion 2 of the lowermost corrugated fiberboard box 1a as shown in FIG. 8. In view of the aforementioned phenomenon, the rear sheet stop 11 is provided to hold high the second and higher-ranked corrugated fiberboard boxes so as to reduce the load, caused by the total weight of the piled corrugated fiberboard boxes lying on the lowermost one, which is applied to the lowermost corrugated fiberboard box 1a being sent out; that is, this rear sheet stop 11 functions so as to halve the weight of a pile acting on the lowermost corrugated fiberboard box 1a.

According to the conventional delivery device described above, the corrugated fiberboard box 1 whose paste at the laminated glued portion 2 is semi-dried is supplied to, dropped and piled in the hopper 1, thus, such a deformed corrugated fiberboard box as shown in FIG. 8 may be reformed within the hopper 3 into such a desired shape as shown in FIG. 7 so as to fall within a certain precision of folding. However, since the paste of the lowermost corrugated fiberboard box 1a to be sent out also is not dried perfectly, in spite of the load due to the weight of the pile being halved by the rear sheet stop 11, some discrepancy arises again at the laminated glued portion 2 to deform the box as shown in FIG. 8 because the box is sent out by means of the friction force existing between it and the send-out conveyor belt 8, and such an inconvenience as above tends to occur often in the winter season during which the rate of drying of paste is low.

SUMMARY OF THE INVENTION

It is an object of the present invention to overcome the foregoing drawbacks of the prior art, thus to provide a delivery device of piled corrugated fiberboard boxes which can alleviate deformation of a lowermost corrugated fiberboard box and prevent occurrence of deformation to thereby enhance the performance of send-out and improve the reliability of kick-out.

To achieve the foregoing object, the present invention provides a delivery device of piled corrugated fiberboard boxes which comprises a hopper for holding therein corrugated fiberboard boxes in a piled mode, a front sheet receiver and a rear sheet receiver held at a position higher than the front sheet receiver and having an inclined guide surface whose height is adjustable. Both receivers are disposed in a lower portion inside the hopper, a kicker is movable back and forth on and along the inclined guide surface for kicking out obliquely the upper and lower sheet end faces of a lowermost corrugated fiberboard box, and upper and lower feed rolls are disposed on the send-out side of the front sheet receiver.

According to the foregoing configuration of the present invention, the under face of the lowermost one among the piled corrugated fiberboard boxes held in the hopper is obliquely supported by the front sheet receiver, and the inclined guide surface of the rear sheet receiver is held at a portion higher than is the front sheet receiver. The upper and lower sheet end faces of the lowermost corrugated fiberboard box are kicked out by the kicker which is movable back and forth along the inclined guide surface, and the lowermost corrugated fiberboard box thus kicked out is forcibly transferred while being pinched between the upper and lower feed rolls. Consequently, deformation of the lowermost corrugated fiberboard box is alleviated, occurrence of deformation is prevented; the performance of send-out is enhanced, and the reliability of kick-out of the kicker is improved through adjustment of the vertical position of the rear sheet receiver.

DESCRIPTION OF THE PREFERRED EMBODIMENT

Figure 1:
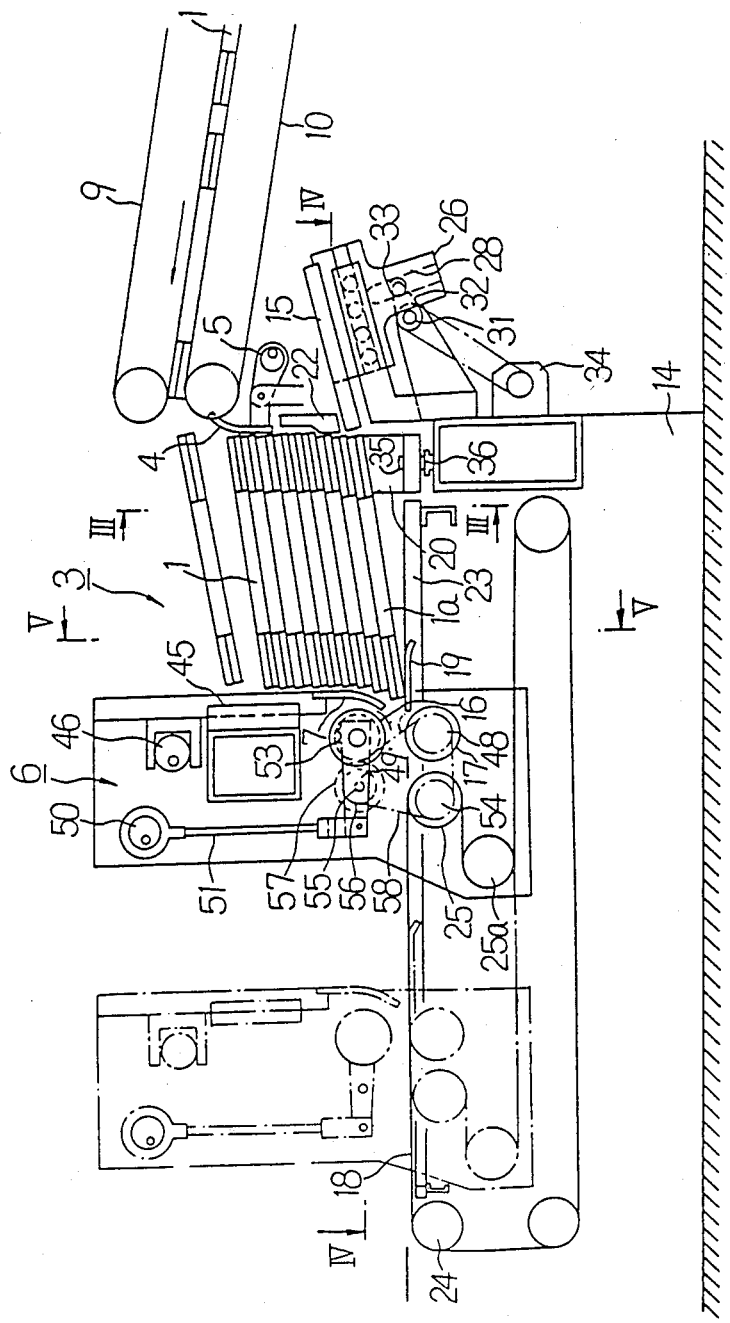
FIG. 1 is a schematic side view showing the overall mechanism of an embodiment of the present invention.
Figure 2:
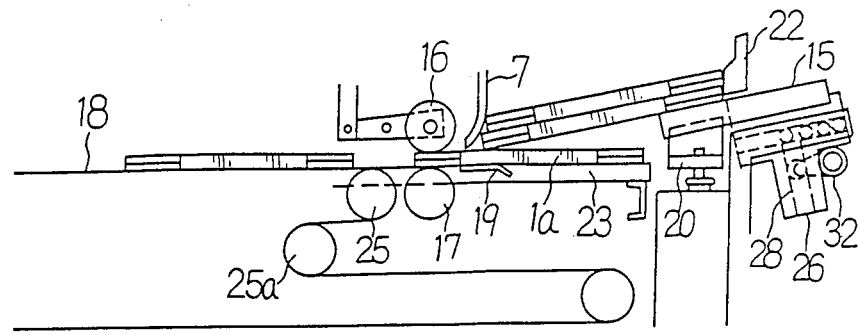
FIG. 2 is a side view of the important portion of FIG. 1, showing the kicked-out state of a lowermost corrugated fiberboard box.
Figure 3:
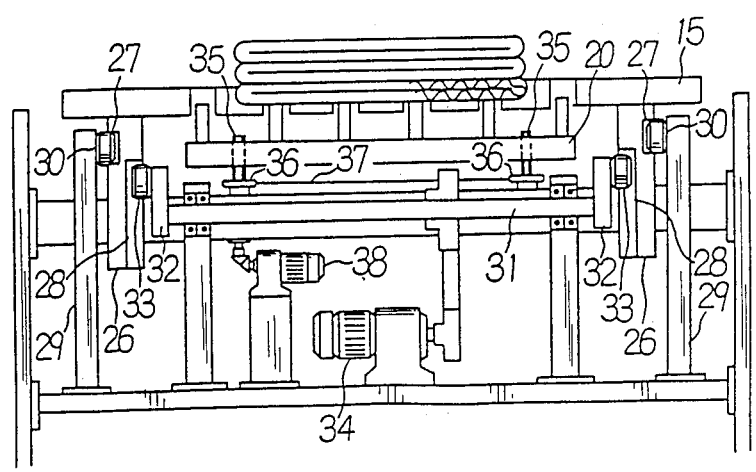
FIG. 3 is a sectional view taken along line III—III of FIG. 1.

FIGS. 1 through 5 show an embodiment of the present invention. The front and rear walls of a hopper 3 are formed by a backstop assembly 6, a front portion or patch 7, a squaring plate 4, a rear sheet guide 22, etc. In a lower portion inside the hopper 3 are provided a rear sheet receiver 20, a fixed rail 23, and a front sheet receiver 19 to support a corrugated fiberboard box 1. The squaring plate 4 is rocked in response to rotation of an eccentric cam 5, this eccentric cam 5 in turn is linked to a lower belt 10, the rear sheet receiver 20 is disposed at a position higher than is the front sheet receiver 19, and the fixed rail 23 is disposed between an expansion transfer conveyor belt 18, a lower feed roll 17, and the front sheet receiver 19, whose front and rear ends are fixed to a beam of a main frame 14. The front sheet receiver 19, front patch 7, upper and lower feed rolls 16 and 17, and driven pulleys 25 and 25a of the expansion transfer conveyor belt 18 are attached to the backstop assembly 6 and operated together therewith. A kicker 15 is inclined so as to harmonize with the inclined guide surface of the rear sheet receiver 20, and attached so as to move back and forth along the inclined guide surface (see FIG. 2).

The kicker 15 has brackets 26 provided on either side, the bracket 26 is formed with a guide groove 27 for guiding the rectilinear motion of the kicker 15 and a cam groove 28 for driving the same, each support mount 29 has a plurality of cylindrical bearings 30 fitted in the guide groove 27, and the kicker 15 is slidably supported by these cylindrical bearings 30.

A drive shaft 31 has at each end an arm 32 having a roller 33 fitted in the cam groove 28; thus, as a motor 34 is energized, the drive shaft 31 is rotated via a belt and the rotation motion of the motor 34 is converted via the cam groove 28 to the rectilinear motion of the kicker 15. The kicker 15 has comb-like cutout grooves 21 on its kick-out side which are fittable with the rear sheet receiver 20, whereas the rear sheet receiver 20 has projections 20a on its upper side which are erected at a spacing corresponding to that of the comb-like cutout grooves 21. These projections 20a define the inclined guide surface by their upper surfaces to support the lowermost corrugated fiberboard box 1a (see FIGS. 2, 3 and 4). Screw shafts 35 are threaded through the rear sheet receiver 20 at its either end portion, these screw shafts 35 are linked mutually via sprockets 36 by a chain 37, and the lower end of one screw shaft 35 is drivably coupled to a motor 38 fixed on the main frame 14. Accordingly, the rear sheet receiver 20 is vertically shiftable while keeping parallelism in response to rotation of the motor 38 (see, particularly, FIG. 3).

The backstop assembly 6 has cylindrical bearings 39 on either side which are seated on guide rails 40 attached to the main frame 14, so that the assembly 6 is supported slidably back and forth. Screw shafts 41 provided on either side of the main frame 14 are threaded through the backstop assembly 6, and these screw shafts 41 are coupled via sprockets 42 and a chain 43 to a motor 44, hence, the backstop assembly 6 is movable while keeping parallelism in response to rotation of the motor 44 (see FIGS. 4 and 5).

The front patch 7 is fitted in a wedge-like groove 45 formed in a fixed beam of the backstop assembly 6, and supported by an eccentric cam shaft 46 via its upper end yoke. The eccentric cam shaft 46 is coupled at its one end to a motor 47. Thus, the front patch 7 is vertically shiftable while keeping parallelism by the use of the wedge-like groove 45 as a guide in response to actuation of the motor 47 (see FIGS. 1 and 5).

Both ends of the lower feed roll 17 are supported by the backstop assembly 6 with a sprocket 48 attached to one shaft end thereof, whereas both ends of the upper feed roll 16 are supported by arms 49 having a fulcrum pin 55 at the center thereof, with one end of the arm 49 having a rod 51 coupled to an eccentric cam shaft 50 for adjustment of the gap between the upper and lower feed rolls 16 and 17. One end of the eccentric cam shaft 50 is linked to a motor 52, thus, the upper feed roll 16 is vertically shiftable while keeping parallelism because the arms 49 are moved via the rod 51 by the motor 52. The upper feed roll 16 has a gear 53 attached to its one shaft end.

One shaft end of a driven pulley 25 has a sprocket 54 attached thereto, the shaft end of the fulcrum pin 55 provided at the center of the arms 49 has a sprocket 56 and a gear 57 attached thereto, and the upper and lower feed rolls 16 and 17 are rotated in the directions of respective arrows via a chain 58 and the gears 53 and 57 through belt-driving at the feed ratio between them being 1:1.

Figure 4:
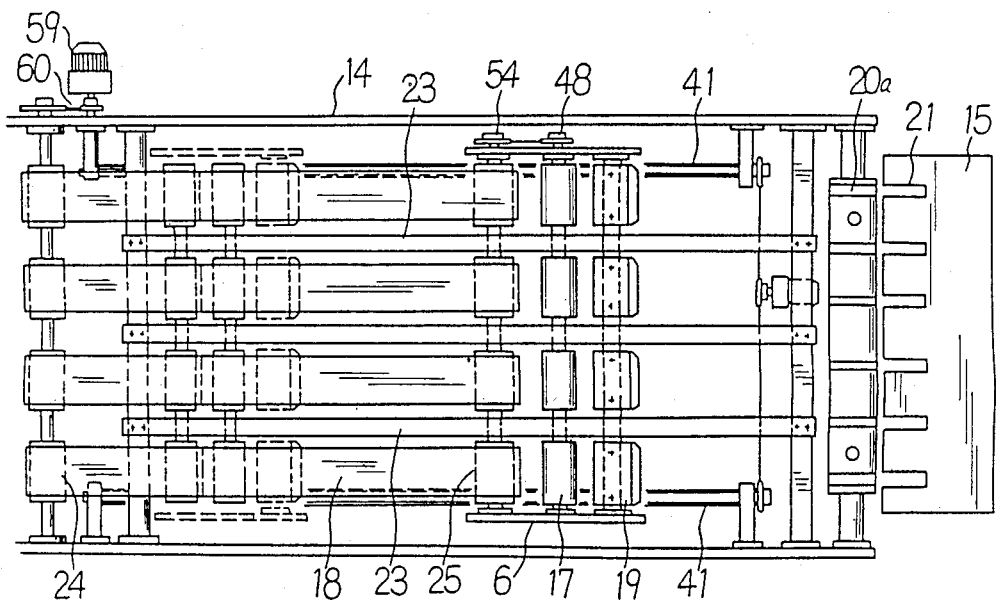
FIG. 4 is a sectional plan view taken along line IV—IV of FIG. 1.
Figure 5:
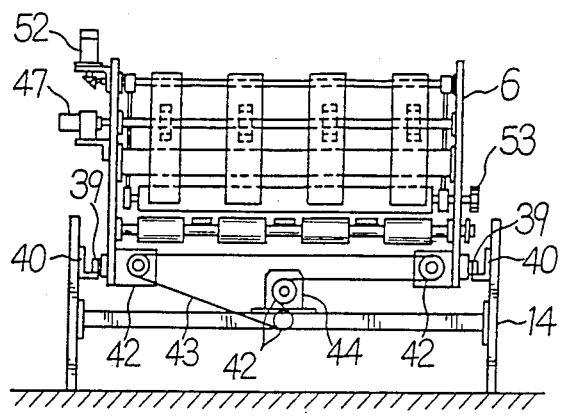
FIG. 5 is a sectional view taken along line V—V of FIG. 1 with the corrugated fiberboard boxes removed for clarity.
Figure 6:
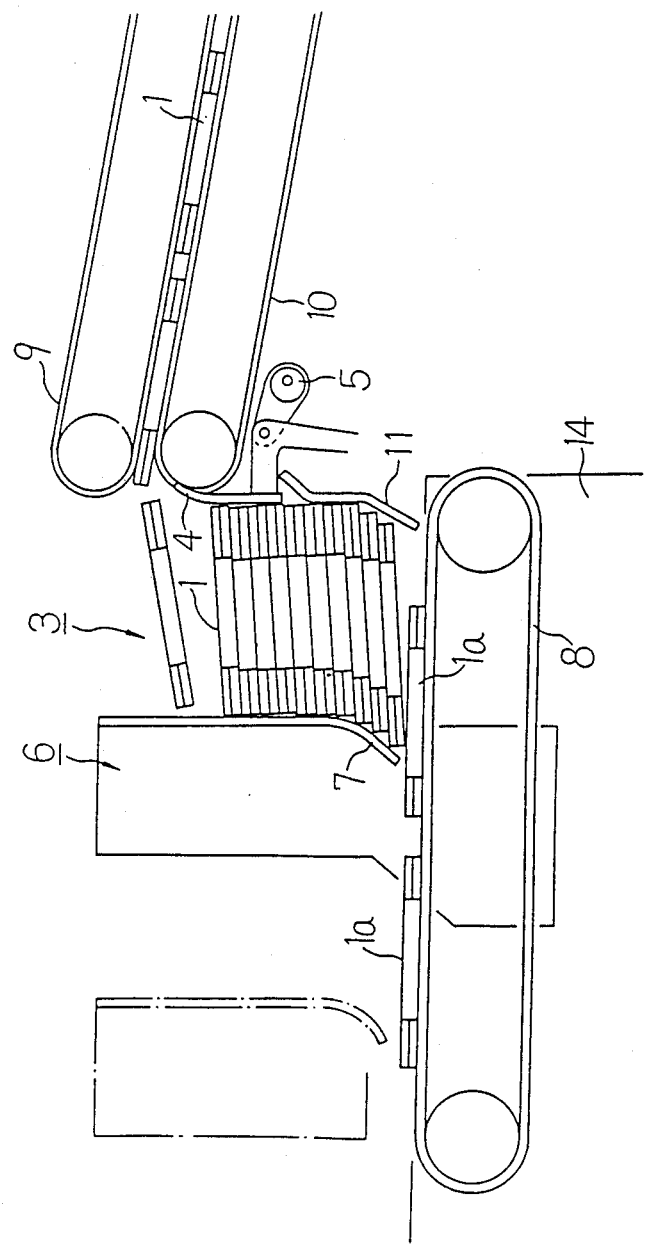
FIG. 6 is a schematic side view showing a conventional device.

The expansion transfer conveyor belt 18 is driven via a driving pulley 24 and a V-belt 60 by a motor 59 fixed to the main frame 14 (see FIGS. 1 and 4).

The operation of the foregoing mechanism will be described. A positioning process is effected for respectively sections before the corrugated fiberboard boxes 1 are supplied to and piled in the hopper 3. That is, the backstop assembly 6 is shifted back and forth up to a given position so as to harmonize with the size of the corrugated fiberboard box 1, the height of the rear sheet receiver 20 is adjusted in accordance with the thickness of the corrugated fiberboard box 1 so that the kicker 15 can abut on both end faces of the upper and lower panels 12 and 13 of the lowermost corrugated fiberboard box 1a, and the gaps below the front patch 7 and below the upper feed roll 16 are adjusted so that the lowermost corrugated fiberboard box 1a can be sent out one by one.

Figure 7:
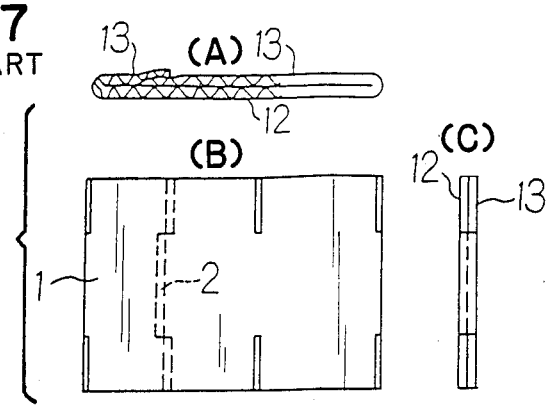
FIG. 7(A), (B) and (C) are a side view, a plan view, and an end view, respectively, of a corrugated fiberboard box.
Figure 8:
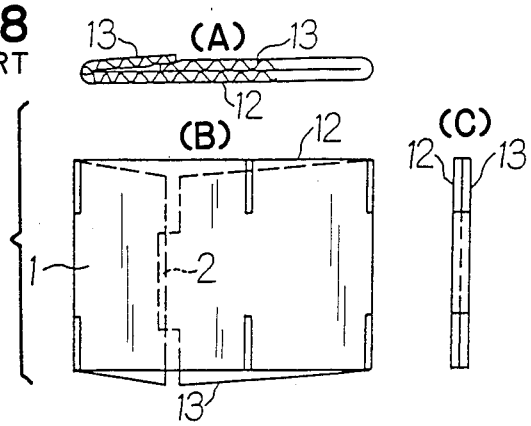
FIGS. 8(A), (B) and (C) are a side view, a plan view, and an end view, respectively, showing one deformed example of the corrugated fiberboard box.
Figure 9:
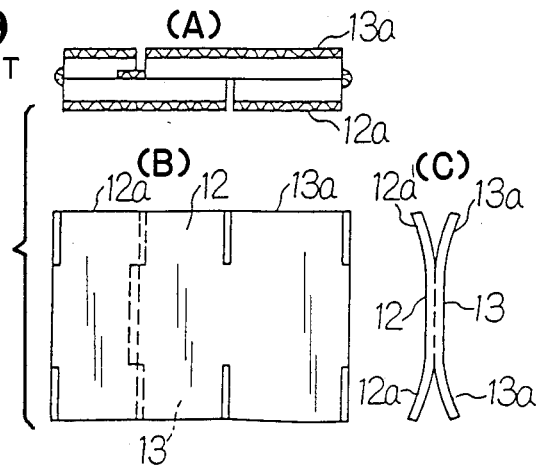
FIGS. 9(A), (B) and (C) are a side view, a plan view, and an end view, respectively, showing another deformed example of the corrugated fiberboard box.

In operation, the corrugated fiberboard boxes 1, having been subjected in successive steps to the processes of recessing, ruled-line drawing, gluing, and folding, are sent in the direction of the arrow by the upper and lower belts 9 and 10; they are supplied to, dropped and piled in the hopper 3 one by one, and the lowermost one 1a among the piled corrugated fiberboard boxes 1 held in the hopper 3 is supported at its front and rear under surface portions by the front sheet receiver 19 and the rear sheet receiver 20. Although the corrugated fiberboard boxes 1 are piled one upon another within the hopper 3 with their paste being merely semi-dried, even such corrugated fiberboard boxes 1 having a poor precision in folding as is shown in FIG. 8 are reformed into a normal shape as shown in FIG. 7 by the squaring plate 4. The lowermost one 1a among the piled corrugated fiberboard boxes 1 held in the hopper 3 is successively sent out one by one by the kicker 15 and the upper and lower feed rolls 16 and 17 at the same speed as the send-in speed at which each corrugated fiberboard box 1 is supplied to the hopper 3 from the preceding step, the kicker 15 continues its forward movement until the lowermost fiberboard box 1a is taken in between the upper and lower feed rolls 16 and 17, and the upper and lower feed rolls 16 and 17 rotating at a 1:1 speed ratio send out the lowermost corrugated fiberboard box 1a without deforming its upper and lower panels 12 and 13 until it comes out of the hopper 3, and hand it over to the expansion transfer conveyor belt 18.

As described above, according to the present invention, in a lower portion inside the hopper 3 for holding therein corrugated fiberboard boxes 1 in a piled mode, are disposed the front sheet receiver 19 and the rear sheet receiver 20 which is held at a position higher than is the front sheet receiver 19 and has the inclined guide surface whose vertical position is adjustable, the kicker 15 movable back and forth on and along the inclined guide surface is provided for kicking out obliquely the end faces of the upper and lower sheets 12 and 13 of the lowermost corrugated fiberboard box 1a, and the upper and lower feed rolls 16 and 17 are disposed on the send-out side of the front sheet receiver 19, hence, the front lower surface and the rear lower surface of the lowermost one among the piled corrugated fiberboard boxes held in the hopper are supported obliquely by the front and rear sheet receivers. Thus, the load applied to the lowermost corrugated fiberboard box caused by the weight of the piled corrugated fiberboard boxes, except the lowermost one, is reduced thereby easing the operation of send-out; the aforementioned weight is concentrated at the front and rear ends i.e., on the send-out side and the kick-out side, of the lowermost corrugated fiberboard box to thereby confine that box in the state where defective folding of the sheets is corrected. The lowermost corrugated box is sent out smoothly from the hopper because the kicker kicks out the end faces of the upper and lower sheets of the lowermost corrugated fiberboard box, and the lowermost corrugated fiberboard box being sent out is transferred while being pinched between the upper and lower feed rolls, so that the corrugated fiberboard box can be prevented from deforming, thereby realizing superior send-out performance.

Further, as the inclined guide surface of the rear sheet receiver is made vertically adjustable, the degree of positional accuracy in kick-out of the kicker with respect to the upper and lower sheet end faces of the corrugated fiberboard box is enhanced and the operation of kicking out the corrugated fiberboard box becomes accurate, thereby resulting in a high reliability. Furthermore, the performance of sending out the corrugated fiberboard box is improved, and consequently, the goods value of the corrugated fiberboard boxes sent out in such a manner as above is remarkably enhanced.

While the present invention has been described with reference to the preferred embodiment, it is to be understood that the present invention should not be limited to such an embodiment and various modifications may be made within the scope of the present invention.

What is claimed is:

1. A delivery device for delivering stacked sheets of sheet materials singly, the device comprising:
   a hopper for receiving and holding a stack of sheets of sheet material;
   a front portion attached to said hopper at the front thereof, said front portion being vertically adjustable and receiving and guiding front edges of stacked sheets;
   a rear sheet guide attached to said hopper at the rear thereof, said rear sheet guide being vertically adjustable and receiving and guiding rear edges of stacked sheets;
   a front sheet receiver attached to said hopper at the lower front thereof, said front sheet receiver receiving, guiding and supporting the front edges of the stacked sheets, said front sheet receiver being disposed below a lower edge of said front portion;
   a rear sheet receiver attached at a fixed position to said hopper at the lower rear thereof, said rear sheet receiver being vertically adjustable and receiving, guiding and supporting rear edges of stacked sheets;
   a reciprocally movable kicker attached to said hopper at the lower rear thereof, said kicker being vertically adjustable and being disposed below a lower edge of said rear sheet guide and substantially rearwardly of said rear sheet receiver, said kicker reciprocating forwardly and rearwardly for pushing a lowermost sheet of the stacked sheets forwardly;
   said rear sheet receiver being higher than said front sheet receiver, said sheet receivers holding the stacked sheets in a forwardly and downwardly oriented position; and
   said rear sheet guide, said kicker, and said rear sheet receiver being respectively vertically adjusted according to the thickness of the sheets being handled, such that said kicker contacts substantially the entire thickness of the lowermost sheet of the stacked sheets when pushing the lowermost sheet.

2. The device of claim 1, wherein an upper surface of said rear sheet receiver is spaced below a lower edge of said rear sheet guide, and at a distance substantially equal to the thickness of the lowermost sheet being handled, an upper surface of said kicker is spaced below and adjacent the lower edge of said rear sheet guide, whereby an upper portion of said kicker contacts substantially the entire thickness of the lowermost sheet of the stacked sheets when pushing the lowermost sheet.

* * * * *